United States Patent
Hopwood et al.

(10) Patent No.: US 7,028,745 B2
(45) Date of Patent: Apr. 18, 2006

(54) APPARATUS AND METHOD FOR FORMING A TERMINAL

(75) Inventors: Robert T Hopwood, Cheltenham (GB); Christopher S Barge, Bristol (GB)

(73) Assignee: TBS Engineering Limited, Cheltenham (GB)

( * ) Notice: Subject to any disclaimer, the term of this patent is extended or adjusted under 35 U.S.C. 154(b) by 0 days.

(21) Appl. No.: 10/501,870

(22) PCT Filed: Jan. 20, 2003

(86) PCT No.: PCT/GB03/00226

§ 371 (c)(1),
(2), (4) Date: Jul. 20, 2004

(87) PCT Pub. No.: WO03/063265

PCT Pub. Date: Jul. 31, 2003

(65) Prior Publication Data

US 2005/0040213 A1 Feb. 24, 2005

(30) Foreign Application Priority Data

Jan. 25, 2002 (GB) ................................ 0201667

(51) Int. Cl.
*B22D 23/06* (2006.01)
*B22D 37/00* (2006.01)
*B22D 39/00* (2006.01)

(52) U.S. Cl. .................. 164/80; 164/133; 164/337
(58) Field of Classification Search ............... 164/80, 164/133–136, 335–337
See application file for complete search history.

(56) References Cited

U.S. PATENT DOCUMENTS

| 4,289,193 A | * | 9/1981 | Stamp ........................ 164/109 |
| 4,458,742 A | * | 7/1984 | Eberle ........................ 164/68.1 |
| 5,505,744 A | | 4/1996 | Eberle et al. |
| 5,606,887 A | | 3/1997 | Spiegelberg et al. |
| 5,791,183 A | | 8/1998 | Spiegelberg et al. |
| 6,123,142 A | | 9/2000 | Ratte |

FOREIGN PATENT DOCUMENTS

| EP | 0 448 792 A2 | 10/1991 |
| EP | 0 993 891 A1 | 4/2000 |
| JP | 03049152 | 3/1991 |
| JP | 9-174226 | 7/1997 |
| WO | 91/05625 | 5/1991 |
| WO | 94/16466 | 7/1994 |

* cited by examiner

*Primary Examiner*—Kuang Y. Lin
(74) *Attorney, Agent, or Firm*—Young & Thompson

(57) ABSTRACT

The invention relates to apparatus and methods for forming a terminal on a battery. Terminal forming apparatus (11) has a mould (12) with a cavity (26) which is intended to encircle the post and bush assembly (22, 25) of a battery box (10). The mould cavity (26) is formed with an open upper mouth (27) and a lateral inlet/outlet (28) which connects with the feed channel (13). Inlet (28) is defined by a weir (29) which acts as a constant height device to define the final filling height of the mould cavity (26). This arrangement allows over filling of the mould above the height of the weir (29) and subsequent dropping of that level to the height of the weir (29). This enables the terminal to be formed at precisely the correct height without the need for any metering of the lead.

23 Claims, 5 Drawing Sheets

Probe Up. Dump Valve Closed.
Lead Pour

Start Position. Mold Located on Bush, Probe Up

Probe Down. Fusing Post & Bush

Probe Up. Dump Valve Closed.
Lead Pour

Mould Over Filled. Lead Pour Stopped. Dump Valve Closed.

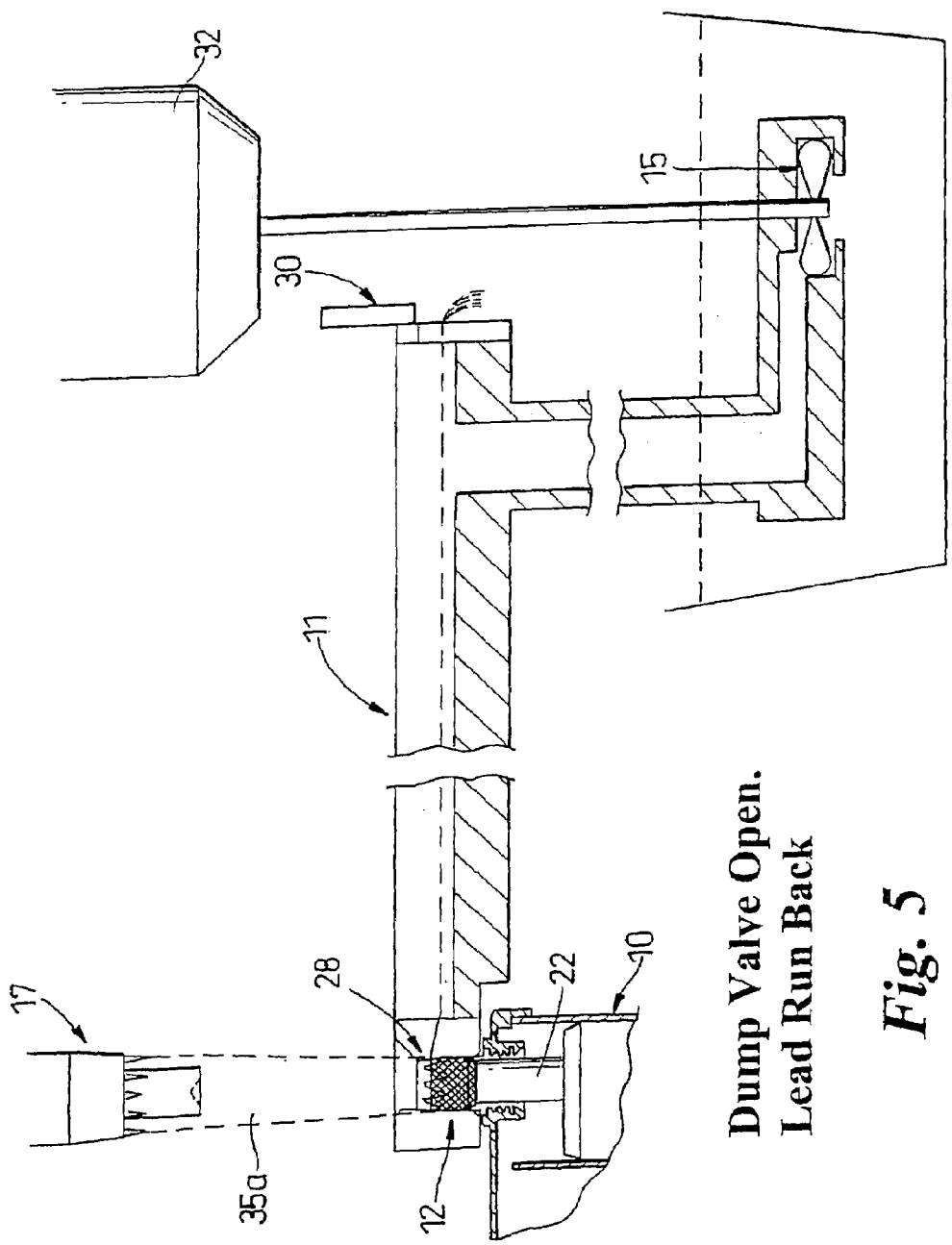

APPARATUS AND METHOD FOR FORMING A TERMINAL

BACKGROUND OF THE INVENTION

1. Field of the Invention

This invention relates to apparatus and methods for forming a terminal on a battery and in particular, but not exclusively, a terminal on the battery of the type having a battery box, containing groups of battery plates, which are interconnected by respective straps to respective posts which connect to the positive or negative terminal respectively.

2. Description of the Related Art

Currently the procedure is to locate and secure the battery lid to the battery box such that the posts pass through a respective aperture in the lid. The aperture is defined by a bush, which may either be substantially flush with the lid or may extend above the lid to the full terminal height. To some extent the bush size is a matter of manufacturing choice, but where high currents have to be drawn, e.g. for diesel engine truck batteries, the terminal height bush is often unsatisfactory, because, in order to assist lead in, the interior hole is essentially frustroconical and the connection formed between the post and the connection formed between the post and the terminal often is of only a small depth. The connection between the post and the bush is formed by fusing the post to the bush, for example by using a heated probe, which is pressed down onto the free ends of the post and bush. It is difficult to form a satisfactory upper surface.

Where the bush is substantially flush with the lid, current procedure is to fuse the post and bush, again by heated probe, and then to mould a terminal on top of the post/bush assembly. Currently the mould is placed upon the assembly and an operative spoons lead into the mould until it is level with the top of the mould cavity. It will be appreciated that this is extremely labour intensive and somewhat slow. Attempts have been made to automate the process, but it is extremely difficult to deliver metered quantities of liquid lead and the alternative approach of feeding lead wire of known diameter at a metered rate immediately falls down, because the cost of forming the wire exceeds the labour cost.

SUMMARY OF THE INVENTION

From one aspect the invention consists in apparatus for forming a terminal on a battery, wherein the battery has a lid having a metal bush and a post connecting a group within the battery and located with its free end in the bush including:
(a) a fusing device for fusing the post to the bush to form an assembly,
(b) a mould having a cavity engaging the assembly and for forming or finishing a terminal characterised in that the mould cavity extends above the intended height of the terminal to allow for overfilling of the mould and the cavity includes a constant height structure to define the final fill level of the mould.

By overfilling the mould and letting the level fall back to the level of the constant height device, the terminal can be formed precisely at the correct height, without any metering of the lead having to take place. This approach, and indeed the method set out below, is beneficial with either type of bush, because in the case of the terminal height bush, the lead can be utilised to fill in any dimples or recesses left after the post/bush fusing step.

The apparatus may include a pump for pumping molten material into the cavity. However the molten material is driven, it may be introduced into the mould via the constant height structure and, conveniently, the constant height structure may be in communication with an inlet/outlet channel, which may include a valve for determining the height of the molten material in the inlet/outlet channel relative to the constant height structure. Thus whilst the valve is open, the lead in the channel may be kept below the level of the constant height structure, whilst when the valve is closed it may rise up above the constant height structure and thus fill the mould.

The constant height structure may be a weir and the weir may be inclined downwardly in the direction of outflow from the cavity.

The apparatus may further include a displacement body for introduction into the mould cavity to ensure that any excess material flows out of the mould.

The fusing device may be a heatable probe for engaging and fusing the post and bush, in which case the tip of the probe may be formed to engage the tip at the post. For example, where the post is bullet-shaped, the free end of the probe may be recessed to accommodate the tip of the post. The probe may have a dependent skirt at its tip for melting at least part of the inner periphery of the bush to enhance the quality of the joint formed. The probe may be mounted for movement into and out of the mould cavity and may constitute the displacement body.

The probe may be heated by at least one gas jet and the apparatus may include a control for increasing the strength of the gas jet when the probe is remote from the cavity after moulding to surface treat the tip of the terminal and/or to displace any flashings from the terminal.

A part of the mould may include a thermal break adjacent the level of the lid of the box to retain heat at the base of the mould.

From another aspect the invention includes a method for forming a terminal on a battery wherein the battery has a lid having a metal bush and a post connected to a group within the battery and located with its free end in the bush wherein the post is initially fused to the bush and the terminal is moulded on the fused bush and post assembly in a mould encircling the assembly characterised in that the mould is initially overfilled with terminal forming material and subsequently the excess material is allowed to flow out of the mould.

Preferably the post is fused to the bush whilst located in the mould and conveniently the post and bush are fused by engagement by a heated probe introduced into the cavity of the mould. The probe may be withdrawn from the cavity during the filling of the mould and subsequently dipped into the mould cavity to displace any remaining excess material.

The method further includes playing a jet of hot gas on the surface of the terminal, after the excess material has flowed out, to remove any flashings.

It is preferred that heat is retained in an area of the assembly while the terminal solidifies. Thus it is particularly preferred that the heat is retained in a region below the tip of the post so as to ensure that fusing takes place along the height of the intended joint.

The tip of the terminal may be re-heated as solidification occurs.

Although the invention has been defined above, it is to be understood that it includes any inventive combination of the features set out above or in the following description.

BRIEF DESCRIPTION OF THE DRAWINGS

The invention may be performed in various ways and specific embodiments will now be described, by way of example, with reference to the accompanying drawings, in which FIGS. 1 to 5 are schematic side views of terminal forming apparatus in different stages of the sequence of operation.

DESCRIPTION OF THE PREFERRED EMBODIMENTS

Figure 1:
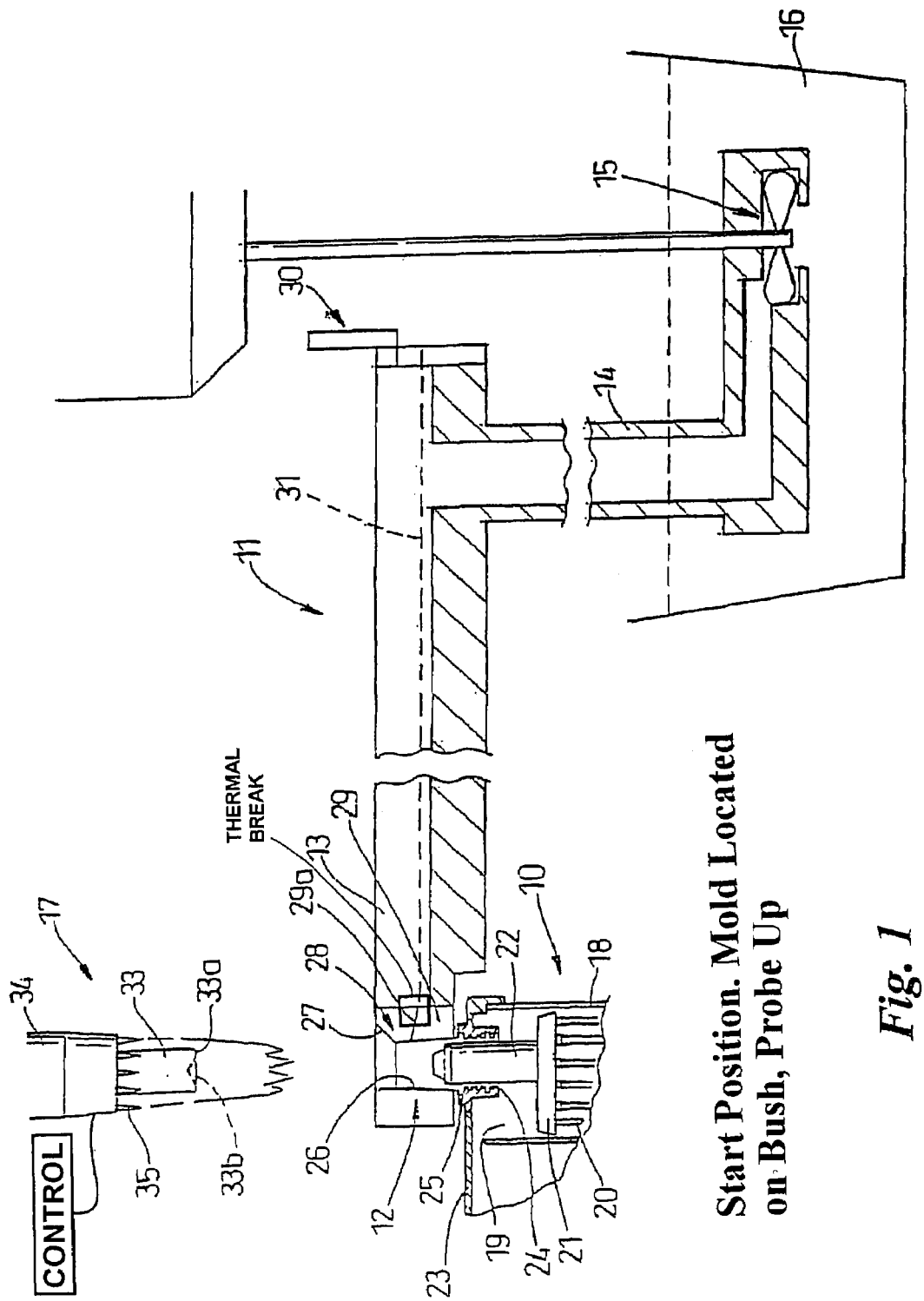

As can be seen in FIG. 1 a battery box, generally indicated at 10, is presented adjacent a terminal forming apparatus 11. The terminal forming apparatus 11 includes a mould 12, an inlet/outlet feed 13, a vertical lead supply pipe 14, a pump 15, a lead pot 16 and a fusing probe assembly generally indicated at 17.

The battery includes a box 18 having compartments, one of which is shown at 19, that contain groups of battery plates 20 that are interconnected by straps 21 that are directly or indirectly connected to a respective one of a pair of posts, one of which is shown at 22. One post 22 is used to form the negative terminal of the battery, whilst the other is used to form the positive terminal. The battery 10 has a lid 23 with an aperture 24, for each post 23, that is defined by a respective bush 25.

As can be seen in the Figures, in use, the battery is presented to the terminal forming apparatus 11 so that the cavity 26 of the mould 12 encircles the post and bush assembly 22, 25.

The terminal forming apparatus 11 will now be described in a little more detail. First it will be seen that the mould cavity 26 is formed with an open upper mouth 27 and a lateral inlet/outlet 28 which connects with the feed channel 13. The inlet 28 is defined by a weir 29, which has an upper surface 29a which is downwardly inclined in the direction of the feed channel 13. The weir 29 therefore serves to act as a constant height structure, which defines the final filling height of the mould cavity 26. A thermal break 13a exists between the weir 29 and the feed 13.

At the other end of the feed channel 13 is a dump valve 30, which is configured such that, when it is open (as illustrated in FIG. 1), the height of lead in the feed channel 13 does not exceed the dotted line 31. I.e. it is kept below the level of the weir 29. The feed channel 13 is supplied by the pump 15, which is driven by a motor 32. The pump 15 drives molten lead from the lead pot 16 up the supply pipe 14 so that it flows into the channel 13.

The probe assembly 17 includes a probe 33 mounted on a head 34 for upward and downward movement, axially, into and out of the mould cavity 26. The head has a crown of gas jets, schematically indicated at 35, which are utilised to heat the probe and for other purposes indicated below.

Figure 2:
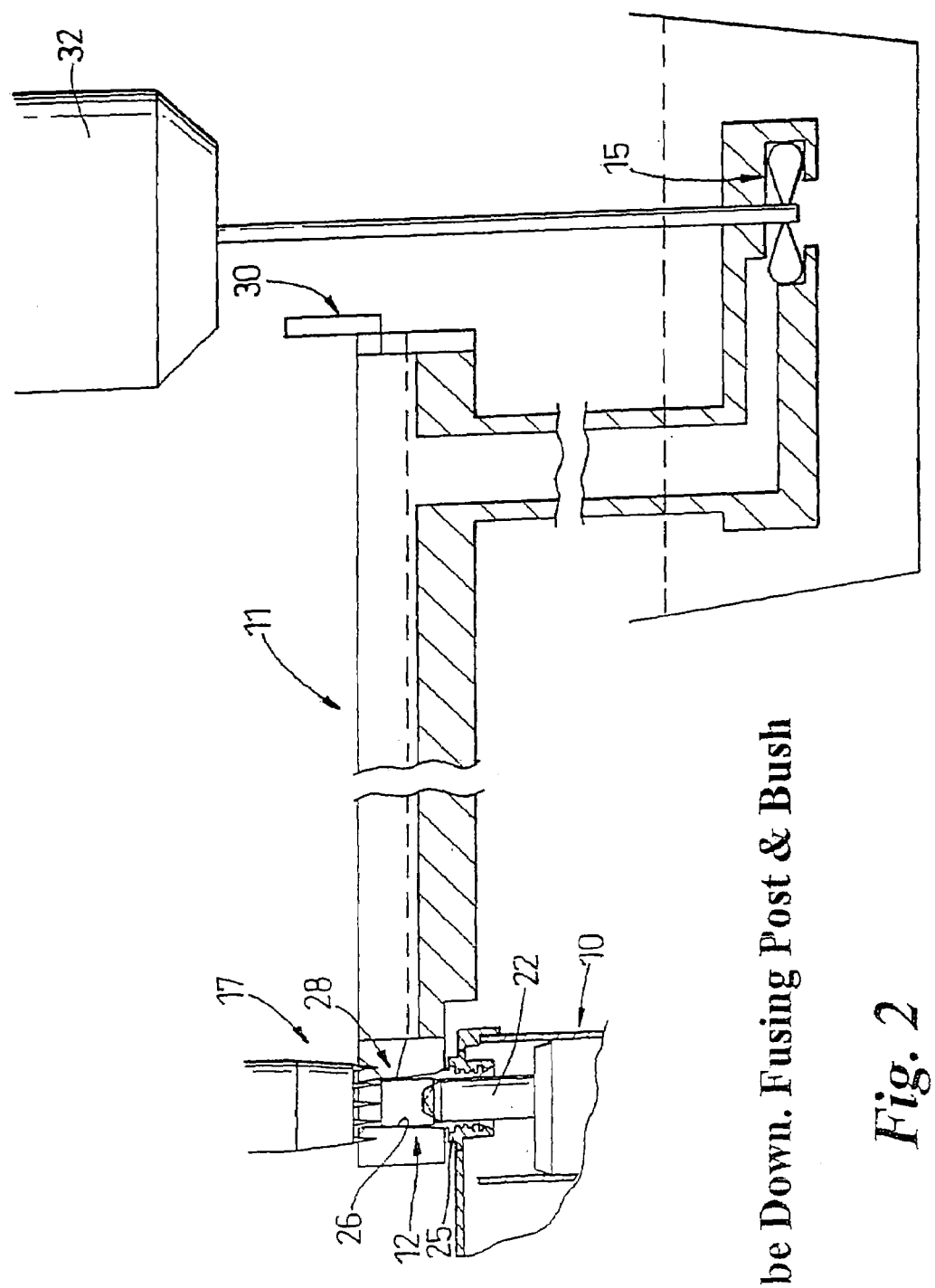

The operating sequence of the apparatus begins with the FIG. 1 position in which, as has already been described, the mould 12 is located on the bush 25 with the probe raised. The pump 15 is preferably circulating at this time, but any excess lead delivered to the feed channel 13 returns to the lead pot 16 via the open dump valve 30. In FIG. 2 the probe assembly 17 is lowered into the mould so that the probe 33 engages the post and bush to fuse the two together. As can be seen in FIG. 1, the tip 33a of the probe 33 is formed with an axially facing recess 33b. This has the advantage that it allows the resultant peripheral skirt of the tip 33a to pass down beyond the upper portion of the post 22 to engage and heat the bush 25 and thus enhance the quality of the joint formed. It will be understood that the shape of the tip 33 can be adapted to accommodate the post and bush structures adopted by particular battery manufacturers.

Figure 3:
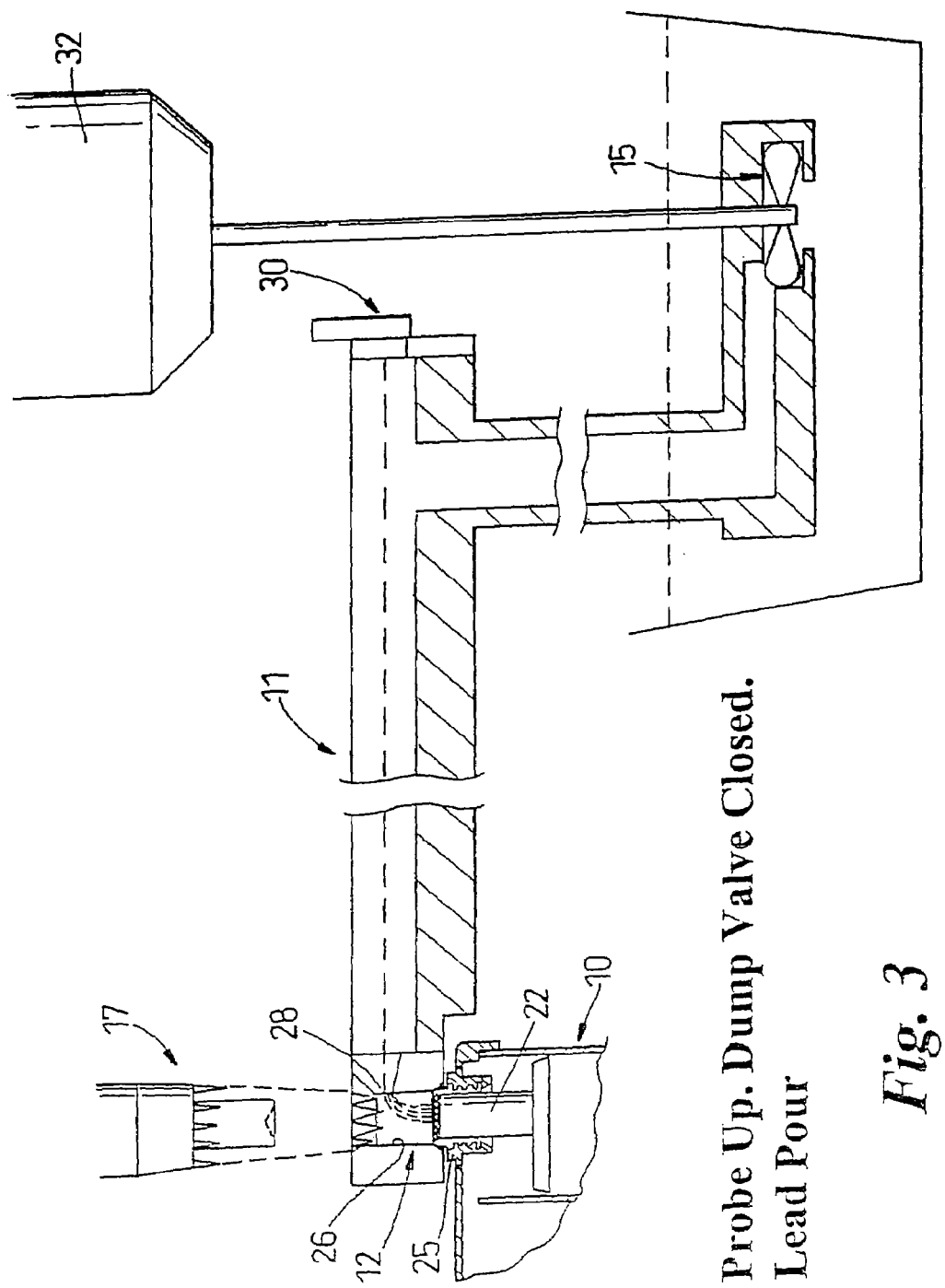
Figure 4:
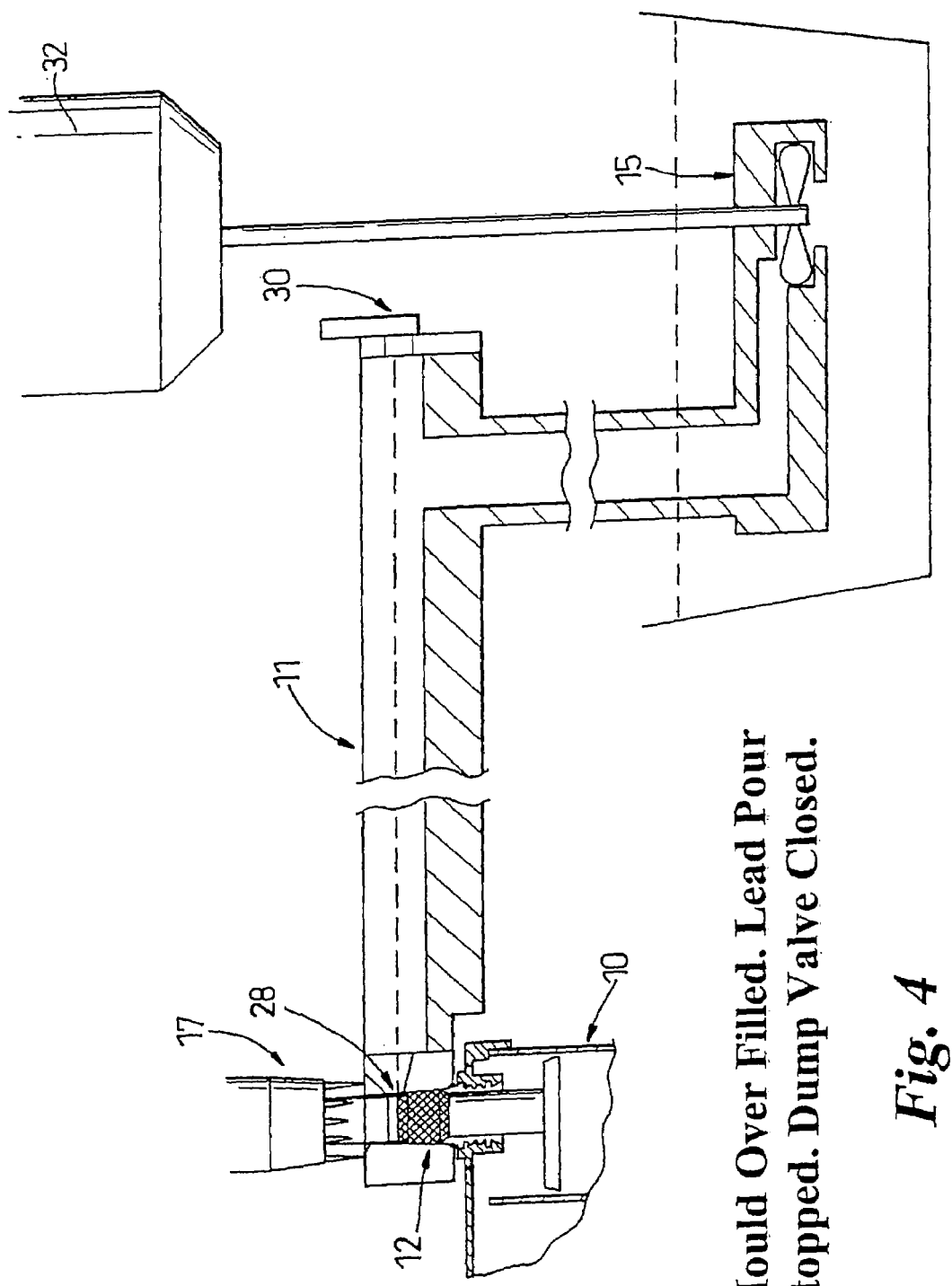

In FIG. 3 it can be seen that the post 22 and the bush 24 have been fused together to form an effective assembly and the probe assembly 17 has been raised. The dump valve 30 is now shut and the level of the lead 31 rapidly rises above the height of the weir 29 so that lead pours into the mould cavity 26 to a height, which is above the height of the weir 29 and hence the intended height of the terminal. At this point the pump 15 can be switched off, as indicated in FIG. 4. The lead level 31 begins to drop until it is approximately level with the top of the weir 29. At this point the probe 33 is once more lowered into the cavity 26 to displace any excess material within the cavity 26 and the commensurate re-heating of the top of the terminal 37, which is forming in the cooling mould, enhances the surface of that terminal.

Finally, as shown in FIG. 5, the dump valve 30 is once more opened allowing the lead to drop below the level of the weir 29 and completing the run back of any lead from the cavity. At this point the gas jets 35 are significantly turned up so that a jet of flame 35b shoots into the mould 26. The combination of heat and gas flow removes any flashings that have been formed around the edge of the terminal and also completes the surface treatment of the terminal 36.

It will be understood that there will usually be two such moulding apparatuses 11 so that the posts of the battery 10 can be processed simultaneously, but alternatively, the battery box could be sequenced on so that the next post can be processed.

Many variations of the apparatus are contemplated. The gas jet heating could be replaced by other heating means, for example an induction heater. The induction heater could be formed on the probe assembly 17 or could even be located in the mould itself. The displacement body could be other than the mould and its function could be replaced purely by the use of a jet of gas to displace excess material.

In general it is desirable to keep the base of the bush warmer than the top of the post during the post fusing stage so as to ensure fusing along the length of the joint. This may be done by providing a thermal break. In some instances care may be needed to ensure that the lid 23 has not melted and cooling air could be applied externally in the vicinity of the bush 25.

Other methods of supplying lead could be utilised. The system simply needs the ability to overflow the weir 29 and then to allow run back of lead out of the mould 26. Thus, for example, the lead could be flowed through the mould 12 or it could be sucked back to enhance run back.

The apparatus and method have substantially been described in connection where the bush is substantially flush with the lid. As has already been indicated, the apparatus and method will also work where the bush is of the same height as the intended terminal, but in that case the amount of lead being utilised on each operation will be small, as it will only be filling in deficiencies in the upper surface of the fused post and bush assembly. This is however an important usage of the apparatus and method, because many manufacturers have significant problems in achieving a suitable surface finish in that case.

The invention claimed is:

1. Apparatus for forming a terminal on a battery, wherein the battery has a lid having a metal bush and a post connecting a group within the battery and located with its free end in the bush including:

a fusing device for fusing the post to the bush to form an assembly, a mold having a cavity capable of receiving the assembly; and means for allowing overfilling of the mold above a predetermined final fill level, and for controllably allowing contents of the overfilled mold to flow out so that the contents reach the predetermined final fill level of the mold.

2. Apparatus as claimed in claim 1, wherein the means for overfilling comprises:

a feed channel adjacent the mold; and a pump for pumping molten material into the cavity through the feed channel.

3. Apparatus as claimed in claim 2, wherein the means for overfilling further comprises: a constant height structure defining the predetermined final fill level, via which the molten material can be introduced into the mold.

4. Apparatus as claimed in claim 3 wherein the constant height structure is in communication with an inlet/outlet channel.

5. Apparatus as claimed in claim 4 wherein the inlet/outlet channel includes a valve for determining the height of molten material in the inlet/outlet channel relative to the constant height structure.

6. Apparatus as claimed in claim 1 wherein the cavity includes a constant height structure which is a weir.

7. Apparatus as claimed in claim 6 wherein the weir is inclined downwardly in a direction of outflow of the contents of the overfilled mold from the cavity.

8. Apparatus as claimed in claim 1 further including a displacement body for introduction into the mold cavity to ensure that any excess material flows out of the mold.

9. Apparatus as claimed in claim 1 wherein the fusing device is a heatable probe for engaging and fusing the post and bush.

10. Apparatus as claimed in claim 9 wherein the tip of the probe is formed to engage the tip of the post.

11. Apparatus as claimed in claim 9 wherein the probe has a dependent skirt at its tip for melting at least part of the inner periphery of the bush.

12. Apparatus as claimed in claim 8 wherein the probe is mounted for movement into and out of the mold cavity.

13. Apparatus as claimed in claim 12 wherein the probe constitutes the displacement body.

14. Apparatus as claimed in claim 9, further comprising at least one gas jet positioned to allow heating of the probe.

15. Apparatus as claimed in claim 14 further including a control for increasing the strength of the gas jet when the probe is remote from the cavity after molding to surface treat the tip of the terminal and/or to displace any flashings from the terminal.

16. Apparatus as claimed in claim 3 wherein a part of the mold includes a thermal break adjacent between the constant height structure and the feed channel.

17. A method for forming a terminal on a battery wherein the battery has a lid having a metal bush and a post connected to a group within the battery and located with its free end in the bush comprising steps of:

providing a mold having an inlet/outlet;

fusing the post to the bush; and molding the terminal on the fused bush and post assembly in the mold encircling the assembly by initially overfilling the mold above a bottom level of the inlet/outlet with terminal forming material and subsequently allowing excess said terminal forming material to flow out of the mold via the inlet/outlet.

18. A method as claimed in claim 17 wherein the post is fused to the bush whilst located in the mold.

19. A method as claimed in claim 18 wherein the post and bush are fused by engagement by a heated probe introduced into the cavity of the mold.

20. A method as claimed in claim 18 wherein the probe is withdrawn from the cavity during filling of the mold and subsequently dipped into the mold cavity to displace any remaining excess material.

21. A method as claimed in claim 17 wherein a jet of hot gas is played on the surface of the terminal, after the excess material has flowed out, to remove any flashings.

22. A method as claimed in claim 17 wherein heat is retained in area of the assembly whilst the terminal solidifies by providing a thermal break near the inlet/outlet.

23. A method as claimed in claim 17, comprising a further step of reheating the tip of the terminal as solidification occurs.

* * * * *